Fig. I.B.
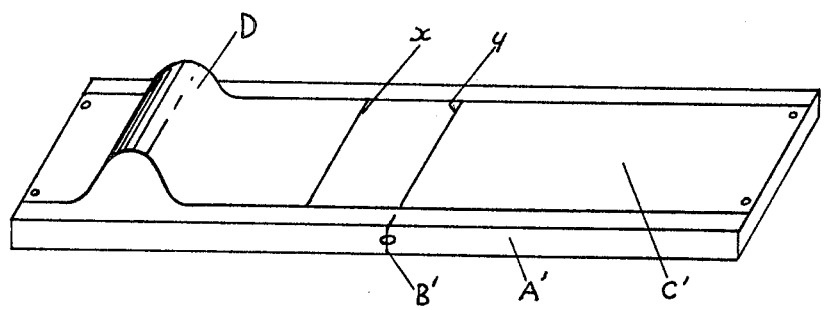
Fig 2A.
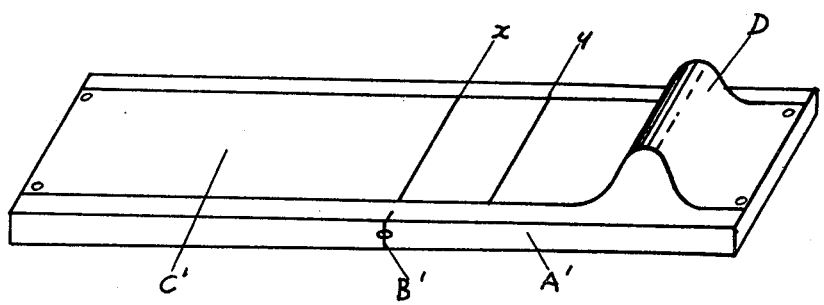

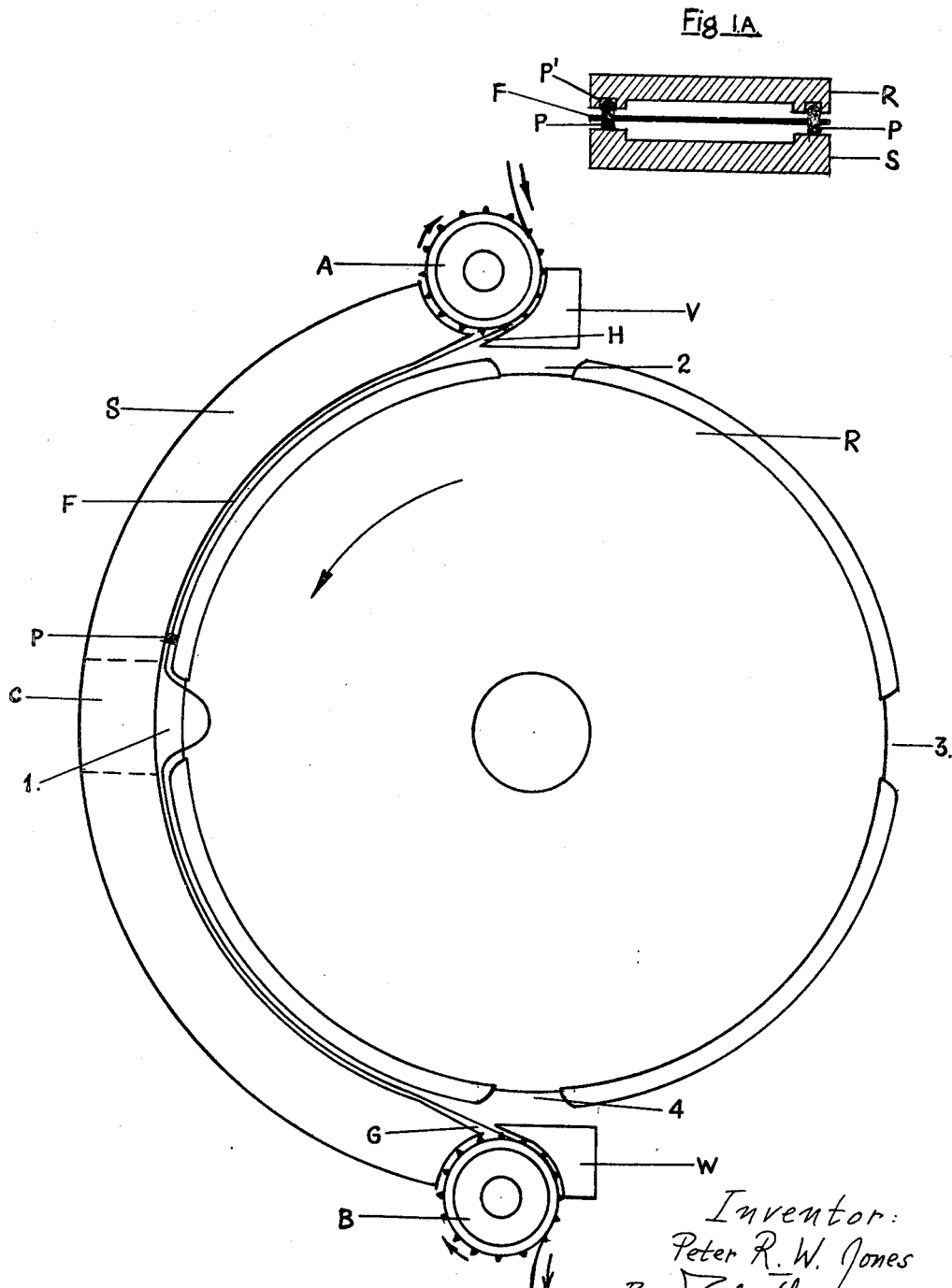

Feb. 10, 1970         P. R. W. JONES         3,494,524
ROLLING LOOP FILM-TRANSPORT MECHANISM
Original Filed April 10, 1967         8 Sheets-Sheet 4

Inventor:
Peter R. W. Jones
By Talo Thein
Agent

Feb. 10, 1970  P. R. W. JONES  3,494,524
ROLLING LOOP FILM-TRANSPORT MECHANISM
Original Filed April 10, 1967  8 Sheets-Sheet 5

Inventor:
Peter R. W. Jones
By Cal Thein
Agent

Feb. 10, 1970 P. R. W. JONES 3,494,524
ROLLING LOOP FILM-TRANSPORT MECHANISM
Original Filed April 10, 1967 8 Sheets-Sheet 8

Inventor:
Peter R. W. Jones
By Tab Hein
Agent

United States Patent Office 3,494,524
Patented Feb. 10, 1970

3,494,524
ROLLING LOOP FILM-TRANSPORT
MECHANISM
Peter Ronald Wright Jones, Beatty Road,
Brisbane, Queensland, Australia
Continuation of application Ser. No. 629,442, Apr. 10,
1967. This application Dec. 5, 1968, Ser. No. 789,633
Claims priority, application Australia, Apr. 18, 1966,
4,374/66
Int. Cl. G03b 1/56; B65h 23/00, 17/44
U.S. Cl. 226—4                 13 Claims

ABSTRACT OF THE DISCLOSURE

A rolling loop film-transport mechanism for advancing sections of forward moving film for exposing the film for any purpose, wherein the film or strip is confined to move in a linear manner between two surfaces, one surface being stationary and the other continuously moving. The stationary surface is fitted with an aperture and one or more projecting pins which at intervals engage the moving film and cause the forward movement of a frame or section of the film to be momentarily stopped in register with the aperture for exposure for any purpose. The moving surface has spaced gaps therein which take up in loops the excess film moving toward the pin. As the loops of film in the gaps roll over the pins and over the aperture, frame interchange is effected in respect of the pins and of the aperture.

---

This application is a continuation application of copending application Ser. No. 629,442, filed Apr. 10, 1967, now abandoned.

In cinematographic machines such as cameras, step printer, projectors and the like, it is necessary that the film be held stationary for a part of each frame cycle when in register with an aperture. This is necessary because the film frame must be in register and stationary with the lens, shutter opening or printer during exposure or printing for example. The term exposure includes the concept of exposing a film as in a camera and the concept of projecting as in a projector. During the remainder of the cycle the film is transported forward a distance of one frame and again brought to rest.

Various devices are in general use for moving the film intermittently, such as reciprocating claws, intermittently moving sprockets and the like acting through film perforations. All of these devices perform their function of intermittently moving the film forward one frame space by applying an intermittent force on the film or strip at the perforations. The inertia of the film strip and the rapid acceleration and deceleration of the film adjacent the aperture is the cause of considerable wear of the film particularly at the perforations. Also, this need to stop and start the film is a limitation on the speed at which the film or strip can be made to move forward.

It is an object of this invention to obtain intermittent movement without acceleratory forces being applied through the film perforations to overcome the film inertia. The manner in which this is accomplished is described by reference to the accompanying drawings, in which:

FIGURES 1, 1A, 2, 3, 4, 5 and 6 are schematic sectional views of a rotary film transport mechanism of my invention suitable for use in a film camera or projector with the transport mechanism being shown in six positions, each representing a consecutive phase of one complete film frame cycle;

FIGURES 1B and 2A are schematic perspective views demonstrating how the linear position of a point on a strip or film may be changed from one position to another by means of a loop or wave motion imparted to a film.

Figure 2:
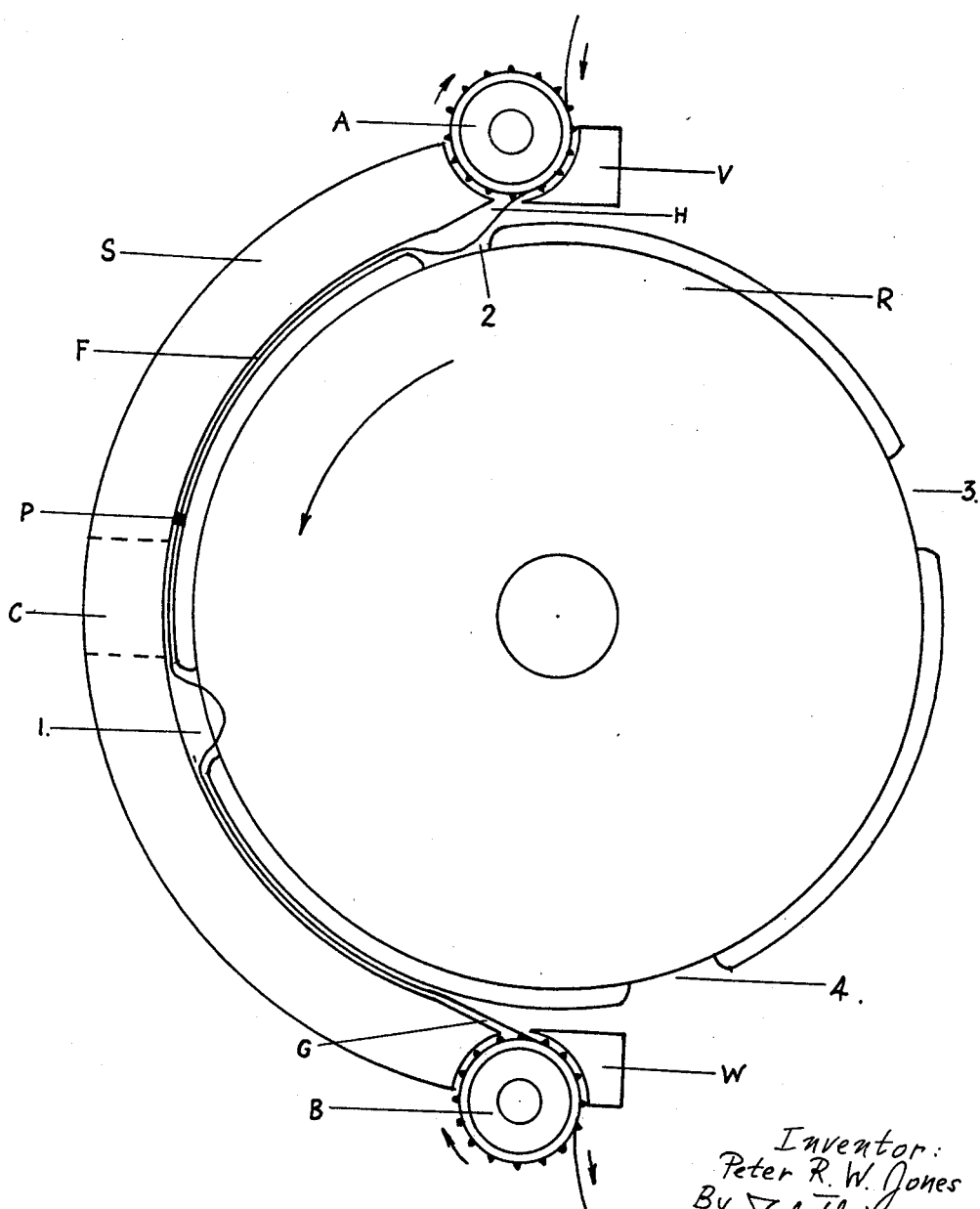

In order to better understand the operation of the film or strip transport mechanism of my invention, reference should be made to FIGURES 1B and 2A illustrating in the simplest form the movement of a single frame or film area by a forward moving loop of film.

A strip of flexible material C', such as film for the purposes of illustration, is affixed at each end to a plate A' carrying a datum mark B'. The strip or film C' has two transverse lines $x$ and $y$ illustrating an area or frame. The film C' is greater in length than the plate A' by the distance between $x$ and $y$. This excess length is absorbed in a loop in the film at D.

As illustrated by FIGURE 1B the loop D and the transverse line $x$ lie to the left of the datum mark B' and the transverse line $y$ on the film C' is in register with the datum mark. In this way the total excess length of the film lies to the left of the datum mark B'.

If the loop D is moved to a new position to the right of the datum mark B' as in FIGURE 2A, then the excess length lies totally to the right of the datum mark and the transverse line $x$ has assumed a position in register with the datum mark B'.

An example of the utilization of this movement in a projector or camera mechanism for the frame by frame transport of a film or strip in accordance with my invention is disclosed by reference to FIGURES 1, 1A and 2 to 6. My mechanism is herein described as applied to 35 millimeter film in which each frame length has four perforations along the edges of the film. The illustrative figures do not purport to disclose all details of a complete apparatus such as shutter, driving mechanism and housing, but rather illustrate the film transport mechanism in six positions each representing a consecutive phase of one complete film frame cycle.

In FIGURE 1, S represents a stator which is a fixed ring or part of a ring of suitable diameter, on the inside surface of which are formed suitable runner tracks to guide a film in such manner that no wear or damage may occur in that portion of the film at which intelligence is or may be recorded. Rotating concentrically and continuously within the stator S is the rotor R, on the outside surface of which preferably are formed similar spaced runners.

Positioned in the stator S is an aperture C of suitable dimension for the exposure of one frame, and positioned on the stator S preferably adjacent to the aperture C are preferably two register pins P. These pins preferably are in juxtaposition such that when a film F having perforated edges is positioned on the inside of the stator S its perforations are engaged by the pins, and a film frame lies over the aperture in correct and fixed register for the exposure of one frame for projection, printing or photographic purposes.

FIGURE 1A illustrates a cross section through the stator S and rotor R adjacent the pins P and parallel to the axis of rotation of the rotor R, showing runners and register pins P. The rotor runners have grooves P' permitting them to clear the register pins P. The film enters the stator S at the slot H and leaves the stator at the outlet slot G. Adjacent to the slot H there is the continuously rotating film sprocket A, with sixteen teeth per side (four frames per revolution) acting to move the film forward into and through the slot H. A similar sprocket B is located adjacent the slot G and acts to control the movement of the film out of the slot G. The sprockets A, B are preferably fitted with suitable pad rollers or shoes V, W to guide the film over their surfaces.

In the apparatus illustrating my invention four gaps 1, 2, 3 and 4 are formed in the rotor and are spaced 90 degrees apart. Each gap is 22½ degrees (1/16 of the circle) in circumferential length. The two sprockets A, B and the rotor R are suitably geared together, preferably in a 1:1 ratio, so that during operation all three members rotate continuously at the same speed in the directions shown by the arrows and, in cooperation with the stator S, keep the film or strip under controlled movement and positioning at all times.

The film F is threaded around the sprocket A, between rotor R and stator S and around the sprocket B as shown. Sufficient clearance is formed between the surfaces of stator S and rotor R and in the entry slot H and outlet slot G so that the film may pass freely. The film thereby is contained in a confined track. The clearances as shown in the accompanying drawings are exaggerated for purposes of facilitating understanding of the drawing. The figures also do not purport to show the aforementioned true engineering dimensions of the rotor gaps 1 to 4 and other details of the apparatus.

In following the progress of one frame cycle of film F through the transport mechanism, the film in FIGURE 1 is registered on the pins P and no slack film lies between the sprocket A and the pins P. At this stage slack film to the extent of three perforations occurs between the pins P and sprocket B, and this slack is absorbed in a loop over the aperture C. This loop is accommodated and controlled as to dimension by the opening of gap 1 in the rotor R.

As shown in FIGURE 2, the rotor R and sprockets A, B have been rotated 1/16 revolution from FIGURE 1, and gap 1 has been moved a distance equal to its own length toward sprocket B and has carried the film loop with it. A section of film now lies in fixed register with the aperture C, and is held from sliding forward by the pins P passing through the film perforations. The loop has also been reduced to a length of two perforations of film since sprocket B has rotated one tooth and taken up one perforation length of film. Gap 2 has now assumed a position just forward of sprocket A and begins to accommodate a second loop being formed of film which has been fed into the mechanism by the rotation of sprocket A by one tooth. The film section lying between gap 1 and gap 2 is stationary, since that film section is immobilized by the pins P engaging the film perforations. As a result the length of film being fed into the mechanism by sprocket A is absorbed by the formation of a loop in gap 2.

Figure 3:
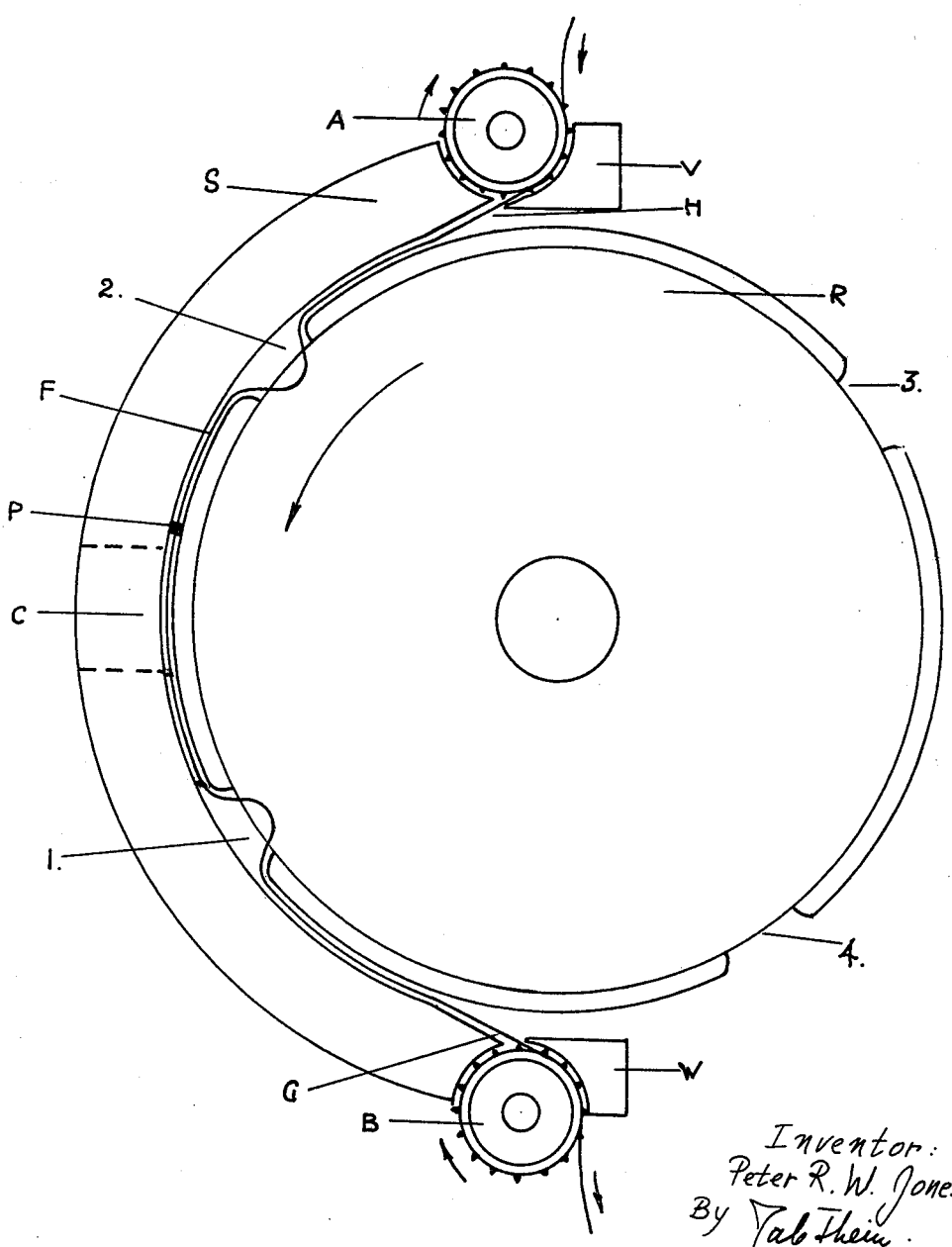

As shown in FIGURE 3, all members have been rotated 1/16 revolution from the position illustrated in FIGURE 2. The loop in gap 1 has been reduced to a length of one perforation of film and the loop in gap 2 has been increased to a length of two perforations of film. The film section over the aperture C between gap 1 and gap 2 has remained in register and stationary.

Figure 4:
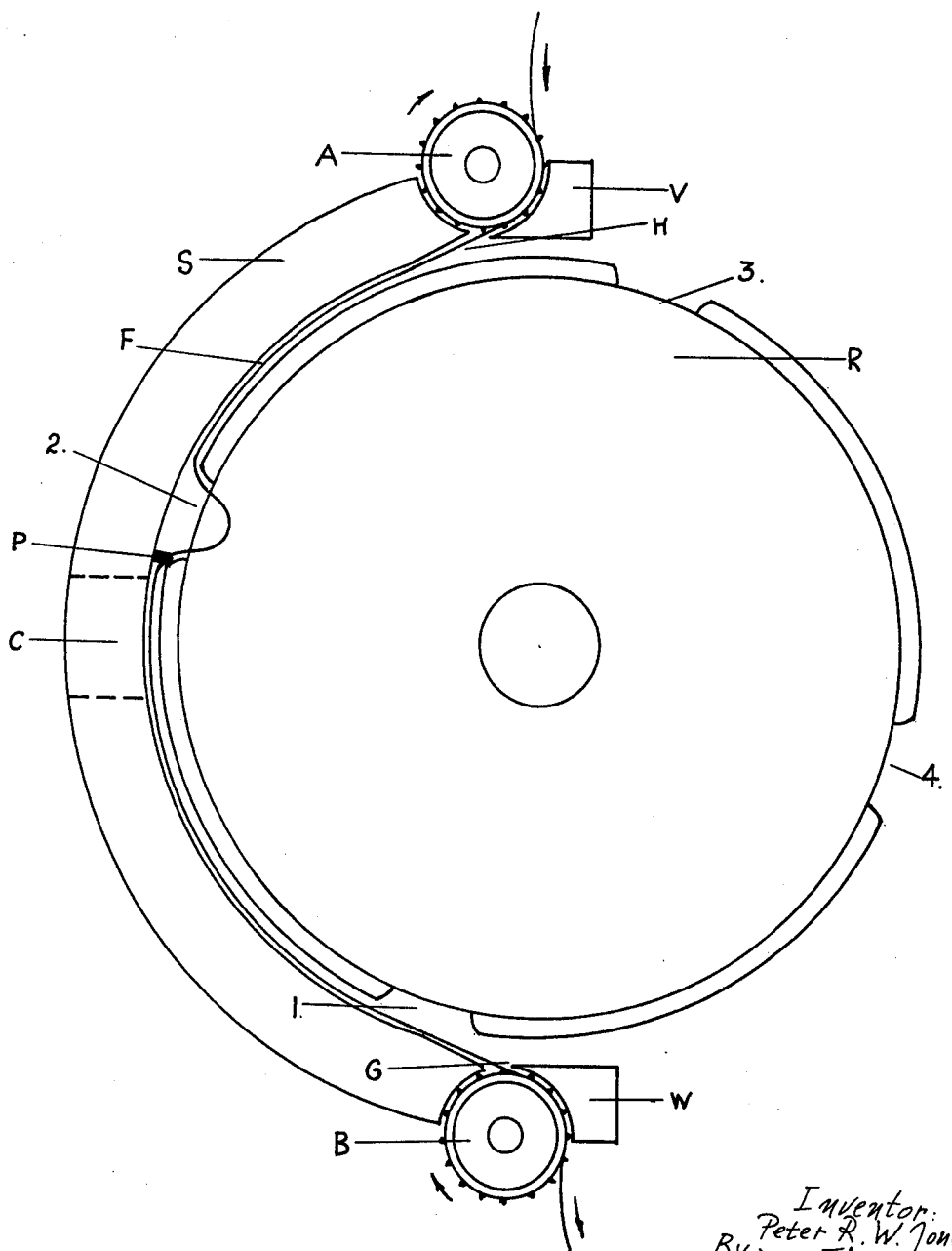

As illustrated in FIGURE 4, all three members A, B and R have been rotated 1/16 revolution from position of FIGURE 3. Gap 1 has arrived at the outlet G to sprocket B and the loop in gap 1 has been reduced to zero. The loop in gap 2 has been increased to three perforations, and at this point the film commences rolling off the register pins P.

Figure 5:
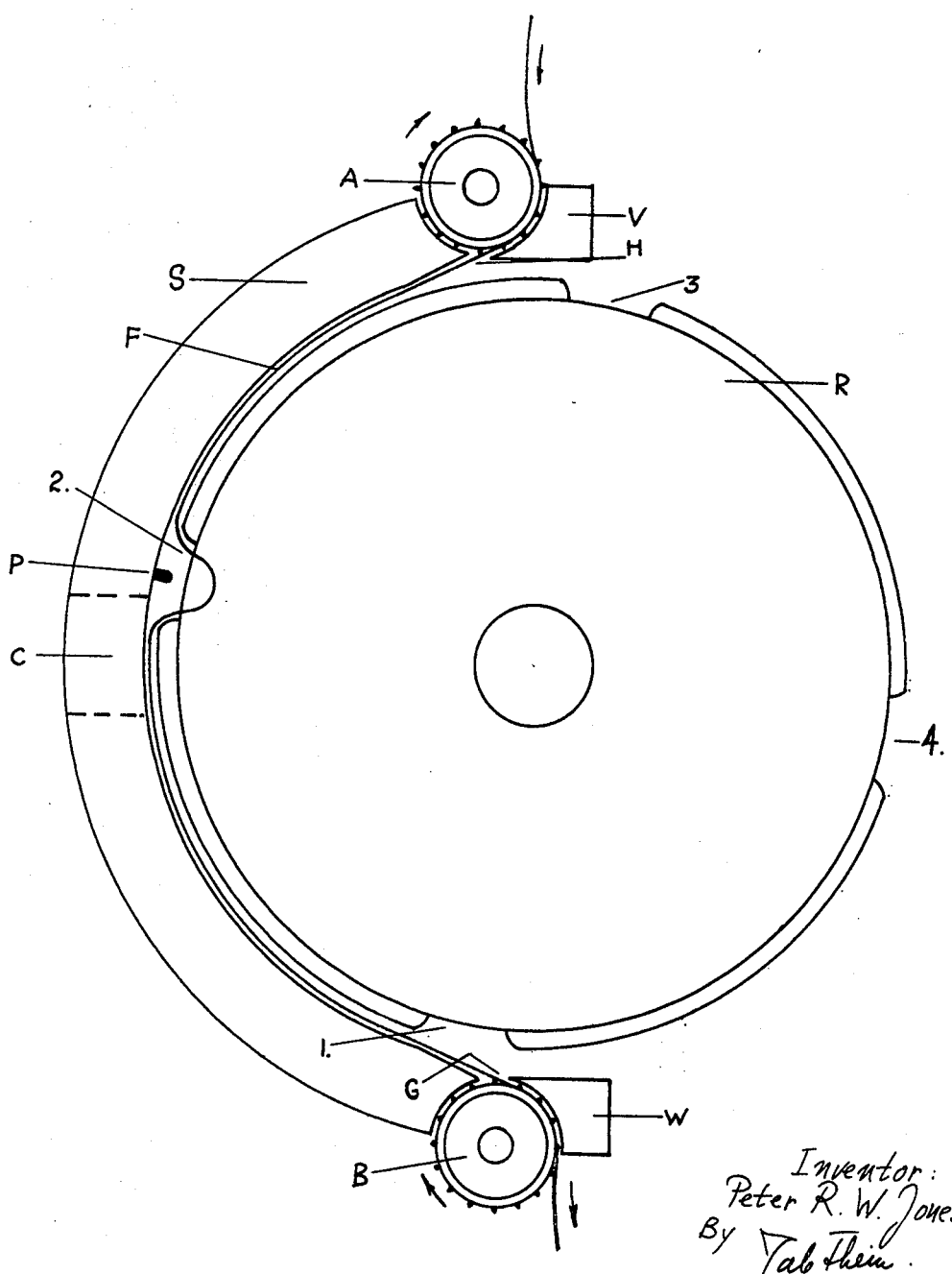

As shown in FIGURE 5, the sprockets A, and B, and the rotor R, have been rotated 1/32 revolution from the position in FIGURE 4. The center of the loop in gap 2 now lies opposite the register pins P. A shutter mechanism, such as is generally provided in cinematographic machinery, may operate at this time to block exposure. Sprocket A is feeding film onto the confined track at the same rate that sprocket B is withdrawing film from the confined track.

It will be understood from the foregoing description that up to the moment that the loop in gap 2 reaches the pins P, is illustrated in FIGURES 4 and 5 the pins P acting through film perforations immobilize the film section located between gap 1 and gap 2 and maintain a section thereof in register with the aperture C. As soon as the film perforations become detached from the pins P the film section advances with respect to the pins P under the control of the sprocket B.

Figure 6:
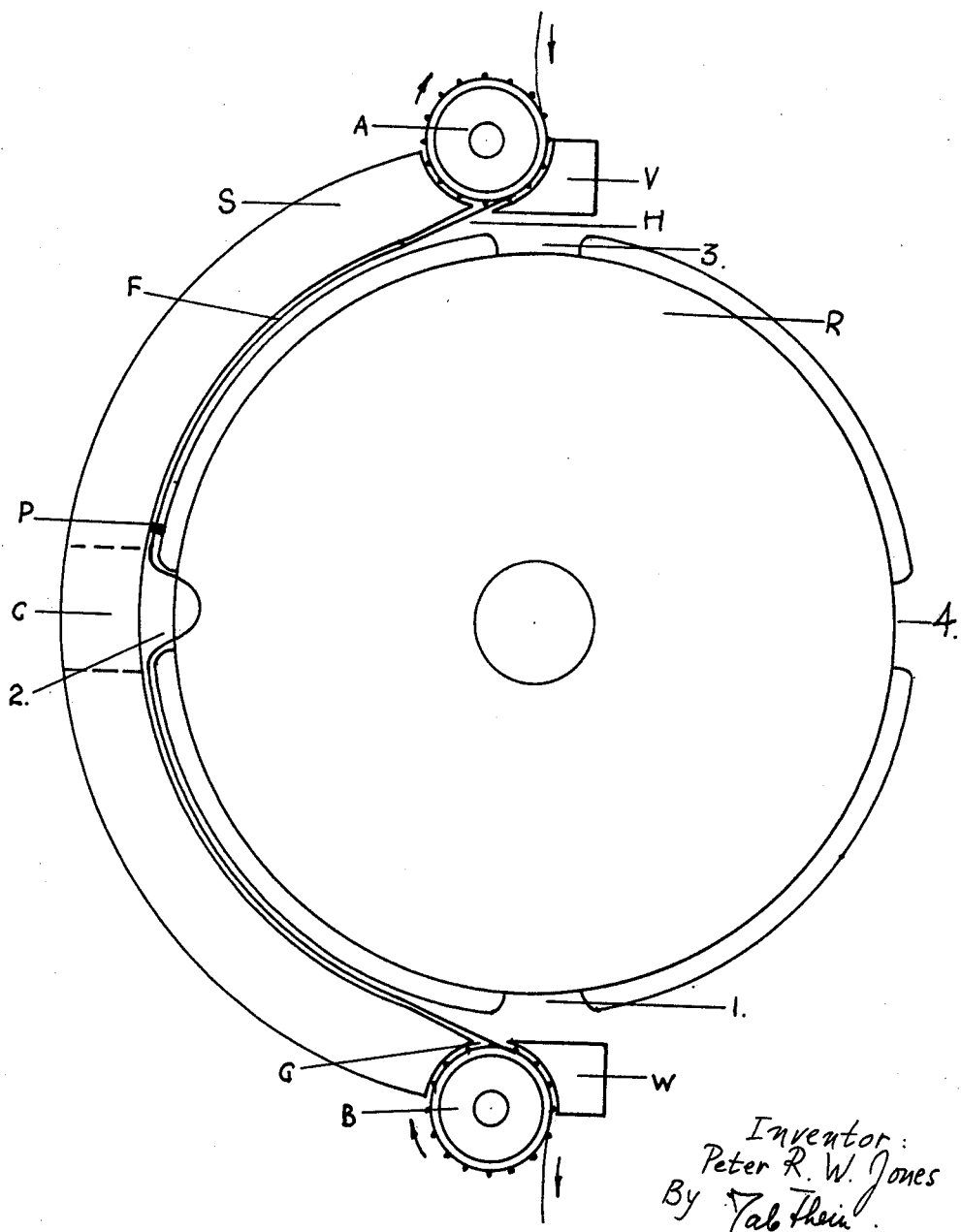

The final phase of the film cycle is illustrated in FIGURE 6, in which the feed and withdrawal sprockets A, B and the rotor R have been rotated ¼ revolution from the position illustrated in FIGURE 1. The trailing edge of gap 2 has now rolled the film onto the pins P four perforations of film advanced in respect of the position of the film section shown in FIGURE 1. Upon completion of one frame cycle the conditions are now similar to those shown in FIGURE 1, but one film frame length advanced. This operation is repeated four times during each revolution of the rotor R and sprockets A, B.

The embodiment described herein is not limited to the use of 35 millimeter film but may be used with film of any gauge. A film may be used having perforations only on one side. The width and thickness of the film and the film material itself are a few of many factors which influence the maximum effective linear speed at which the film can advance through the mechanism of the invention.

The equivalent of a frame or section length need not necessarily be limited to any specific number of perforations, but may be varied either by varying the diameters of the sprockets or the gearing to the sprockets, such that a greater or lesser number of perforations is fed into and out of the loops. For example, a frame having a length of eight perforations of film may be used by increasing the sprocket diameters to twice those herein described (32 teeth) or alternatively gearing the 16 tooth sprockets 2:1 relative to the rotor.

The arrangement of rotor and stator may also be changed to suit varied applications. For example, the rotor need not be limited to four gaps, but may use any combination of gap, rotational speed and related speed of the sprockets, provided that there are, in the operational area between inlet and outlet points, gaps to accommodate both incoming and outgoing loops. The size of the opening of the film loop may be varied to lengthen or shorten the interchange period between frames. The opening of the film loop is controlled and fixed by the dimensions of the gap openings in the rotor.

The register pin or pins P on the stator surface need not necessarily be immediately adjacent to the aperture in the stator, but their preferred position would depend on the spacing and position of the film perforations relative to the frame and the need for fixed registery with the aperture. They also may be positioned below the aperture. The number of register pins is not limited to one on one side.

The aperture and register pins need not be integral with the stator, but may be inserted and suitably attached to the stator as desired.

Suitable rollers may be fitted at the edges of the rotor gaps in order to reduce friction on the film entering and leaving the gaps. It may also be desirable to replace the solid segment on the rotor between gaps with a series of rollers or runners suitably mounted to the rotor and spaced to permit, if desired, projection through the rotor. These modifications are not illustrated.

Figure 7:
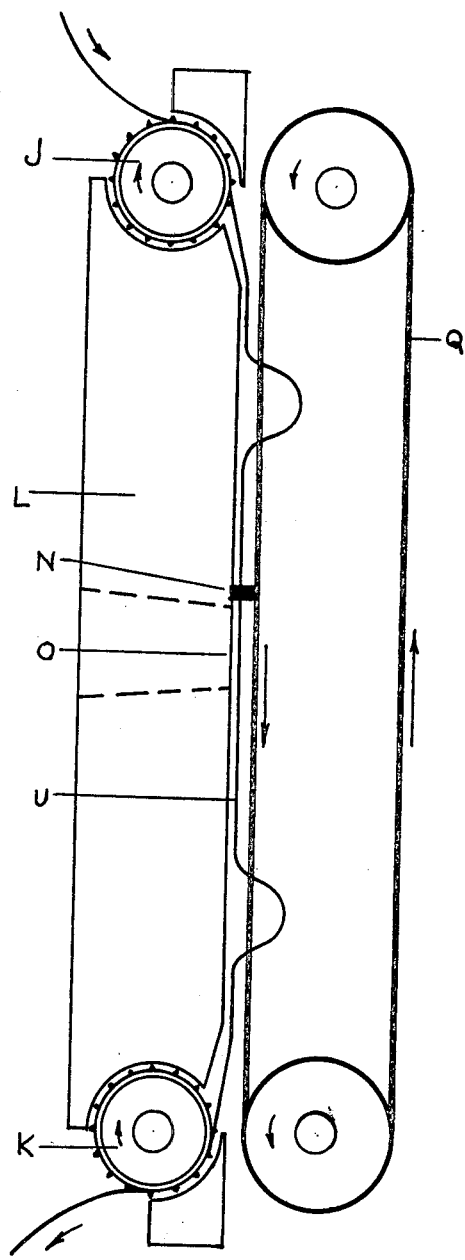
FIGURES 7 and 7A are schematic and perspective views illustrating a straight line transport system which may be preferred in some cases to a rotary system.
Figure 7A:
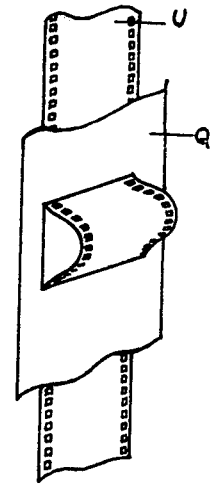

FIGURES 7 and 7A illustrate a straight-line system which may be preferred to a rotary system. In FIGURES 7 and 7A, letters J and K represent the film sprockets and U identifies the film which is confined between the aperture block L having an aperture O and an endless band Q.

The band Q may be of flexible material or may be composed of articulated links (not shown), of suitable form and spaced to permit, if desired, projection therethrough. Runners may be used to supply the necessary clearance for the avoidance of contact with the information area of the film. The band Q may also be provided with grooves to clear the register pins N on the aperture block.

The band Q has a suitable number of gaps formed in the manner illustrated in FIGURE 7A, and these gaps accommodate the loops which are rolled onto and off the register pins in the same manner as that previously described with reference to the rotary mechanism.

I claim:

1. In a cinematographic or similar machine in which a film must remain stationary for a portion of each frame cycle, a film transport mechanism in which the film is confined between two surfaces spaced apart to enable the film to move in a free linear manner between them without being pinched, one surface being stationary and the other surface moving in line with the length of film which has at least one edge perforated to register on fixed pins extending from the stationary surface; a loop in the film formed between two transverse edges of a gap in the moving surface, said gap traveling towards the register pins carrying the loop with it without effecting any linear movement of the film between the gap and the register pins thereby resulting in a stationary film section; an aperture formed through the stationary surface to expose the stationary film section beyond the boundary of the machine for recording or reproduction purposes; and means for feeding the film linearly between the two surfaces from a point in the stationary surface away from which the gap is moving to increase the size of said loop as it moves with and within the gap, for disengaging the film from the pins as the front of the loop passes therefrom, and as the back of the loop passes, for reengaging the film with the pins one frame in advance, to effect frame interchange.

2. The film transport mechanism in accordance with claim 1, in which said two surfaces are curved.

3. The film transport mechanism in accordance with claim 1, in which said two surfaces are substantially straight.

4. In a cinematographic or similar machine in which a film moves between two adjacent means having cooperative film guiding surfaces, said film remaining stationary intermittently to position a section of the film in relation to an aperture in said cooperative surface means, an improvement comprising a film transport mechanism wherein:
    (a) one of said cooperative surface means is stationary and has an aperture therein;
    (b) the other of said cooperative surface means is continuously movable in the same direction as the film;
    (c) means for engaging the film to hold a section of the film stationary and in fixed register at said aperture to permit exposure of the stationary section of film through said aperture;
    (d) spaced gaps in said moving surface means having leading and trailing edges, each of said gaps when opposite said stationary surface means being adapted to receive a film loop; and
    (e) means for continuously and simultaneously feeding and withdrawing the film linearly between said cooperative surface means in the direction of movement of said movable surface means whereby said film loop is gradually increased in said gap as said gap moves toward said holding means and is gradually decreased as said gap moves away from said holding means, with the leading edge of said loop acting to cause said film to disengage from said holding means and the trailing edge of said film loop acting to cause said film to reengage the said film onto said holding means as said film loop passes said holding means.

5. The film transport mechanism as defined in claim 4, wherein said stationary surface means is arcuate and said movable surface means is a cooperative rotor.

6. The film transport mechanism as defined in claim 4, wherein said stationary surface means is substantially flat and the cooperative portion of said movable surface means is substantially flat.

7. The film transport mechanism as defined in claim 4, wherein said means for engaging the film comprises at least one pin projecting from said stationary surface.

8. The film transport mechanism as defined in claim 4, wherein said means for engaging the film is located adjacent said aperture.

9. The film transport mechanism as defined in claim 4, wherein said means for continuously and simultaneously feeding and withdrawing the film comprise two sprockets.

10. The film transport mechanism as defined in claim 5, wherein said cooperative rotor has four gaps.

11. In a cinematographic or similar machine in which a film must remain stationary to position a section of the film in relation to an aperture, an improvement comprising a film transport mechanism comprising a stator having an aperture, a rotor cooperating with said stator, means for moving a film between said stator and said rotor into said aperture zone and in the direction of movement of said rotor means for controlled withdrawal of the film from said aperture zone, a plurality of spaced gaps in said rotor capable of receiving film loops, means acting with said film moving means for gradually increasing, then gradually decreasing the film loops within said spaced rotor gaps when said gaps are opposite said stator and for intermittently holding said film in fixed position in register with an aperture in said aperture zone.

12. The film transport mechanism as defined in claim 11, wherein the means for moving the film between said stator and said rotor and the means for controlled withdrawal of film from said aperture zone comprise at least one toothed sprocket wheel.

13. A method for continuously advancing film for intermittent exposure in a cinematographic device, comprising the steps of:
    (a) momentarily securing said film at a point, whereby a section of said film is in register with an aperture in said cinematographic device;
    (b) continuously moving said film forward toward said securing point;
    (c) forming a loop having a leading and a trailing edge in said forward moving film a predetermined distance in advance of said securing point as said moving film urges against said securing point;
    (d) simultaneously increasing the size of said film loop to a predetermined size and rolling said film loop toward said securing point, as said forward moving film continuously moves into said loop;
    (e) rolling the leading edge of said forward moving film loop over said securing point and thereby releasing said film from said securing point;
    (f) rolling the trailing edge of said forward moving film loop over said securing point and thereby securing said film at a point immediately behind said trailing edge, thereby effecting the movement of a new section of film into register with the aperture;

(g) continuously moving said forward moving film away from said securing point;

(h) simultaneously decreasing the size of said forward moving film loop and rolling said film loop away from said securing point after said film loop has passed over said securing point until said film loop disappears; and (i) repeating the steps of the method thereby advancing film continuously and providing for intermittent exposure of sections of film.

References Cited

UNITED STATES PATENTS

| | | | |
|---|---|---|---|
| 2,675,736 | 4/1954 | Gentilini et al. | 226—55 X |
| 3,165,250 | 1/1965 | Ewald et al. | 226—55 |
| 3,214,233 | 10/1965 | Persidsky | 352—184 |

M. HENSON, WOOD, JR., Primary Examiner

U.S. Cl. X.R.

226—6, 8, 59, 113, 155, 190